(12) United States Patent
Kloz et al.

(10) Patent No.: US 9,937,441 B2
(45) Date of Patent: Apr. 10, 2018

(54) ION EXCHANGER FOR A COOLING CIRCUIT

(71) Applicant: MANN+HUMMEL GMBH, Ludwigsburg (DE)

(72) Inventors: Andreas Kloz, Bietigheim-Bissingen (DE); Volker Kuemmerling, Bietigheim-Bissingen (DE); Markus Beylich, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 183 days.

(21) Appl. No.: 14/739,050

(22) Filed: Jun. 15, 2015

(65) Prior Publication Data
US 2015/0273356 A1 Oct. 1, 2015

Related U.S. Application Data

(63) Continuation of application No. PCT/EP2013/074368, filed on Nov. 21, 2013.

(30) Foreign Application Priority Data

Dec. 14, 2012 (DE) .................. 10 2012 024 428

(51) Int. Cl.
| | |
|---|---|
| *B29C 45/14* | (2006.01) |
| *B01D 15/36* | (2006.01) |
| *H01M 10/613* | (2014.01) |
| *H01M 10/625* | (2014.01) |
| *H01M 10/6568* | (2014.01) |
| *B01J 47/022* | (2017.01) |
| *H01M 8/04044* | (2016.01) |
| *H01M 8/04029* | (2016.01) |

(Continued)

(52) U.S. Cl.
CPC .......... *B01D 15/361* (2013.01); *B01J 47/022* (2013.01); *B29C 45/14795* (2013.01); *B29C 45/1671* (2013.01); *B29C 45/17* (2013.01); *H01M 8/04029* (2013.01); *H01M 8/04044* (2013.01); *H01M 10/613* (2015.04); *H01M 10/625* (2015.04); *H01M 10/6568* (2015.04); *B29K 2101/00* (2013.01); *B29K 2715/003* (2013.01);
(Continued)

(58) Field of Classification Search
CPC .............. B01D 27/08; B29C 45/14336; B29C 45/14344; B29C 45/14778; B29C 45/14795; B29C 2045/1436; B29C 2045/14803
See application file for complete search history.

(56) References Cited

U.S. PATENT DOCUMENTS 2,525,497 A * 10/1950 Monfried ............... B01J 47/022
 210/290
3,730,349 A * 5/1973 Herrmann ............. B01J 47/022
 210/281

(Continued)

FOREIGN PATENT DOCUMENTS

| DE | 102009037080 A1 | 2/2011 |
|---|---|---|
| WO | 8202150 A1 | 7/1982 |

*Primary Examiner* — Gregg Cantelmo
(74) *Attorney, Agent, or Firm* — James Hasselbeck

(57) ABSTRACT

An ion exchanger for a coolant circuit is provided with a housing that has an inlet and an outlet for a coolant. An ion exchanger medium is disposed in the housing. The housing is made of a plastic material and is an injection-molded part. A first plastic filter element is arranged in the outlet and embedded by injection molding in the first plastic material of the housing. In the inlet, a second plastic filter element is arranged and embedded by injection molding in the plastic material of the housing.

3 Claims, 2 Drawing Sheets

(51) Int. Cl.
  *B29C 45/16* (2006.01)
  *B29C 45/17* (2006.01)
  *B01J 47/02* (2017.01)
  *H01M 8/04* (2016.01)
  *B29K 101/00* (2006.01)
  *B29L 31/14* (2006.01)

(52) U.S. Cl.
  CPC ...... *B29L 2031/14* (2013.01); *H01M 2220/20* (2013.01); *H01M 2250/20* (2013.01); *Y02T 90/32* (2013.01)

(56) References Cited

U.S. PATENT DOCUMENTS

| | | | |
|---|---|---|---|
| 4,871,463 A * | 10/1989 | Taylor | B01D 15/08 210/263 |
| 5,766,469 A * | 6/1998 | Boast | B01D 29/012 137/550 |
| 5,824,217 A | 10/1998 | Pearl et al. | |
| 6,045,600 A | 4/2000 | Michaelis et al. | |
| 8,007,948 B2 | 8/2011 | Hobmeyr et al. | |
| 8,481,770 B2 * | 7/2013 | Sugo | A23J 7/00 554/78 |
| 2002/0008058 A1 * | 1/2002 | Nugent | G01N 30/6065 210/198.2 |
| 2003/0070975 A1 * | 4/2003 | Hogan | B01D 29/01 210/232 |
| 2003/0133841 A1 * | 7/2003 | Weber | G01N 27/44704 422/400 |
| 2011/0062073 A1 * | 3/2011 | Proulx | B01D 29/111 210/321.86 |
| 2012/0037555 A1 * | 2/2012 | Lundin | B01D 15/22 210/198.2 |
| 2012/0055862 A1 | 3/2012 | Parekh | |
| 2012/0250923 A1 * | 10/2012 | Beck | H04R 25/654 381/328 |
| 2013/0098826 A1 * | 4/2013 | Kloz | B01J 47/06 210/287 |

* cited by examiner

ION EXCHANGER FOR A COOLING CIRCUIT

CROSS-REFERENCE TO RELATED APPLICATIONS

This application is a continuation application of international application No. PCT/EP2013/074368 having an international filing date of 21 Nov. 2013 and designating the United States, the international application claiming a priority date of 14 Dec. 2012, based on prior filed German patent application No. 10 2012 024 428.2, the entire contents of the aforesaid international application and the aforesaid German patent application being incorporated herein by reference.

BACKGROUND OF THE INVENTION

The invention concerns an ion exchanger for a coolant circuit, comprising a housing that is provided with an inlet and an outlet for a coolant, wherein in the housing an ion exchanger medium is received.

DE 10 2009 012 379 A1 discloses an ion exchanger for the coolant circuit of a fuel cell. By means of the ion exchanger, undesirable ions that, for example, may be generated by contact of the coolant with a metal housing are to be removed from the coolant. The ion exchanger comprises a cartridge in which an ion exchanger resin is received that is flowed through by the coolant. For this purpose, the ion exchanger cartridge is provided with an inlet and an outlet that each are covered by a porous cover in order to retain the ion exchanger resin in the housing of the cartridge while the coolant passes through it.

A comparable device is disclosed also in DE 10 2009 037 080 A1 which also discloses an ion exchanger in the coolant circuit of a fuel cell. The cartridge is embodied as an upright cylindrical body that has an inlet at the bottom wherein the ion exchanger resin is retained by a screen above the inlet.

SUMMARY OF THE INVENTION

The invention has the object to produce with simple measures an ion exchanger for a coolant circuit.

This object is solved according to the invention in that the housing is comprised of plastic material and is produced as an injection-molded part, wherein a plastic filter element is arranged in the outlet and is embedded by injection molding in the plastic material. The dependent claims provide expedient further embodiments.

The ion exchanger according to the invention is used in coolant circuits in order to remove positively or negatively charged ions from the coolant. Such coolant circuits are used for cooling, for example, in fuel cell systems in which electric current is generated electrochemically, for example, for driving an electric motor in a vehicle. As a further application example, the ion exchanger can be used in a coolant circuit of a vehicle battery. Basically, an application of the ion exchanger for coolant circuits in stationary devices is conceivable also.

The ion exchanger comprises a housing manufactured of plastic material and comprising an inlet and an outlet for the coolant. The housing receives an ion exchanger medium which is flowed through by the coolant whereby the ions in the coolant, i.e., the anions and cations, are removed by the ion exchanger medium from the coolant. The ion exchanger medium is present, for example, as a granular resin which may comprise an anion exchanger resin for negatively charged ions and a cation exchanger resin for positively charged ions. The ion exchanger resin for the anions and cations are provided in a defined mixing ratio in this context.

In order to prevent the ion exchanger medium from being washed out of the housing, at least in the outlet, expediently however also in the inlet, a plastic filter element is arranged, respectively. The plastic filter element in the inlet has furthermore the task of filtering the incoming coolant and of removing entrained dirt particles.

For a simplified manufacture of the ion exchanger, the housing is configured as an injection-molded plastic part produced by an injection molding process. The plastic filter element is embedded by injection molding. Inasmuch as in the inlet as well as in the outlet a plastic filter element is provided, these two plastic filter elements are embedded by injection molding in the housing.

This has the advantage that inexpensive plastic filter elements can be used and cost-intensive filter elements of porous metallic materials or sintered glass plates can be dispensed with.

Moreover, it is advantageous that the plastic filter element can be produced in a separate manufacturing step in that the powder-like material is sintered and, subsequently thereto, is inserted into the injection molding tool. It is furthermore advantageous that a subsequent fixation of the plastic filter element in the housing is not required. By embedding the plastic filter element in the plastic material of the housing, the filter element is secured sufficiently in a required position in the outlet or inlet of the housing. Additional fastening measures are not necessary.

The plastic filter element is, for example, embodied as a screen or a frit and has numerous pores through which the coolant flows and whose diameter is however small enough in order to retain the ion exchanger medium. Inasmuch as plastic filter elements are arranged in the outlet as well as in the inlet, they are expediently identical or at least embodied similarly.

During the injection molding process, the plastic material can penetrate into the pores at the rim of the plastic filter element so that a form-fit connection with the plastic material of the housing is produced. In addition, the contour of the plastic filter element may be engagingly surrounded by the plastic material of the housing so that also in this way a form-fit connection relative to the housing is provided.

According to a further expedient embodiment, the plastic materials of housing and filter element have at least approximately the same melting point. During the manufacturing process, the pre-manufactured plastic filter element is secured in its position in the mold and is embedded by injection molding in the plastic material which forms the housing. Due to the same or at least similar melting point, the plastic filter element can melt at its rim area and produce a connection to the material by material fusion. Accordingly, not only a form-fit connection but also a connection by material fusion is realized between the plastic filter element and the housing.

It may be advantageous to employ for the housing and the filter element the same type of plastic material.

In the manufacturing process, at least one plastic filter element is arranged in the outlet within the tool; advantageously, one plastic filter element each is provided in the outlet and the inlet of the housing to be manufactured. The plastic filter element(s) is/are secured in position in the tool by means of suitable holding devices. The plastic material of the housing is injection molded in the injection molding process and the plastic filter element is embedded by injection molding, wherein optionally the pressure during the injection molding process is increased in order to have an influence on the plastic filter element, in particular, for reducing the pore size of the plastic filter element.

BRIEF DESCRIPTION OF THE DRAWINGS

Further advantages and expedient embodiments can be taken from the additional claims, the figure description, and the drawings.

In the figures, same components are provided with same reference characters.

DESCRIPTION OF PREFERRED EMBODIMENTS

Figure 1:
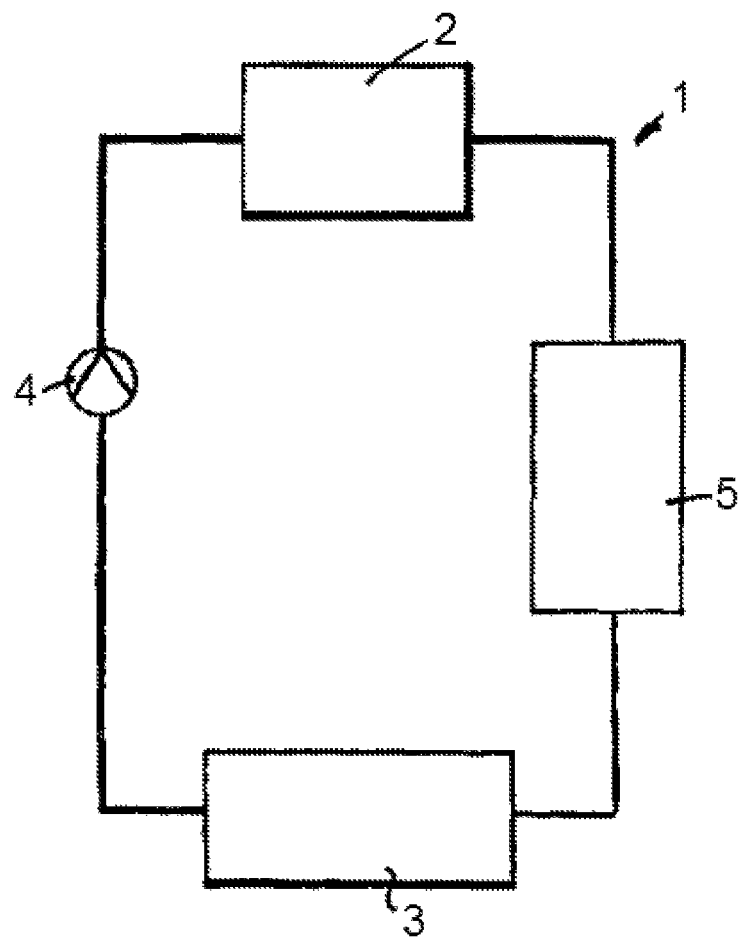
FIG. 1 shows schematically a coolant circuit for a fuel cell system with integrated ion exchanger.

FIG. 1 shows in a greatly simplified way a coolant circuit 1 for a fuel cell system 2 that electrochemically produces electric current, for example, for driving an electric motor of a vehicle. In the coolant circuit 1, a heat exchanger 3 is integrated by means of which heat is dissipated. The flow circulation is maintained by means of a pump 4. Moreover, in the coolant circuit 1 an ion exchanger 5 is integrated which is provided with an ion exchanger medium which is flowed through by the coolant in the coolant circuit. In this way, ions in the coolant can be bonded to the ion exchanger medium and thereby removed from the coolant.

As an ion exchanger, for example, a granular anion exchanger resin and a granular cation exchanger resin are conceivable, wherein both types of resins are mixed and received in the ion exchanger 5 and are provided in a defined quantity ratio relative to each other.

Figure 2:
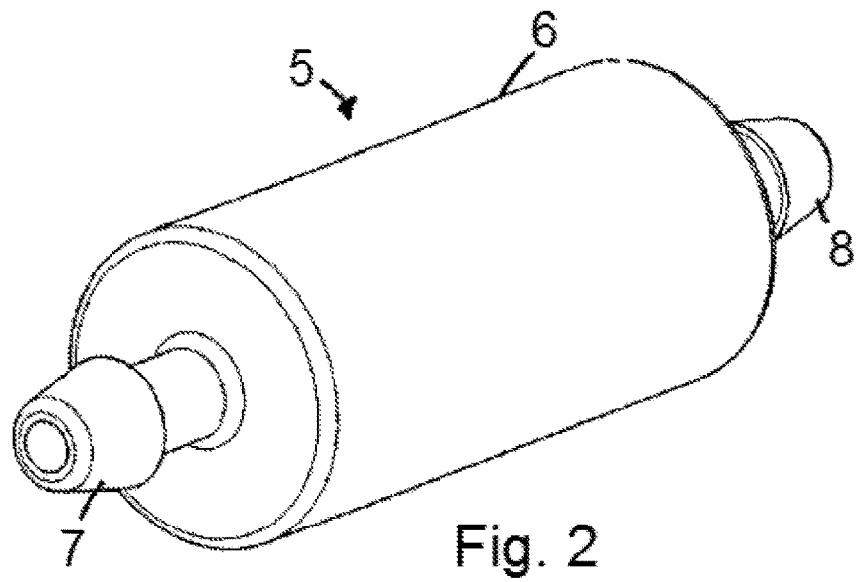
FIG. 2 shows the ion exchanger in perspective view.
Figure 3:
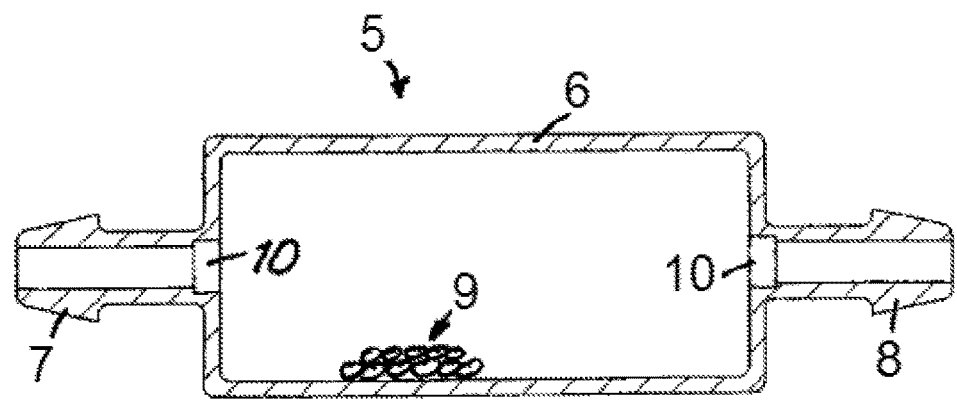
FIG. 3 is a longitudinal section through the ion exchanger.

As shown in the illustration of the ion exchanger 5 according to FIGS. 2 and 3, the ion exchanger 5 has a cylindrical housing 6 in which, as indicated, granular ion exchanger resin 9—anion exchanger resin and cation exchanger resin—is received. The housing 6 is provided on opposite end faces with an inlet 7 and an outlet 8 for supply or discharge of coolant.

As shown in FIG. 3, in the inlet 7 as well as in the outlet 8, neighboring the interior of the housing 6, respectively, a plastic filter element 10 is located that prevents the ion exchanger resin 9 from being washed out of the housing 6. The plastic filter elements 10 have moreover a filtration function in that, at least at the inlet side, dirt particles entrained in the coolant are filtered out by the plastic filter element 10. The plastic filter elements 10 in the inlet 7 and outlet 8 are preferably identically embodied.

The housing 6 of the ion exchanger 5 is comprised of plastic material and is produced by a plastic injection molding process. During the manufacture of the housing 6, the two plastic filter elements 10 are embedded by injection molding in the plastic material of the housing so that in a common working step the plastic housing 6 is produced and the pre-manufactured plastic filter elements 10 are integrated into the housing 6 as well.

During the manufacture, the plastic filter elements 10 are secured and fixed by suitable holding devices, for example, plungers, in their position in the tool in which the plastic material is injection molded for producing the housing. The plungers or holding devices secure the plastic filter elements 10 in particular at their end faces so that penetration of the injection-molded plastic material into the end faces of the plastic filter elements 10 is prevented. In this way, it is ensured that the pores in the plastic filter element 10 remain at least substantially free of plastic material and that the coolant can be introduced into the housing or discharged therefrom via the inlet or the outlet.

The connection between the plastic filter elements 10 and the housing 6 is realized by form fit and material fusion. Preferably, for the plastic filter elements a plastic material is used that has a similar or identical melting point and same chemical structure as the plastic material of the housing so that the circumferential side of the plastic filter elements upon injection molding of the plastic material of the housing will melt and a connection by material fusion between the plastic filter elements and the housing is produced. At the same time, the plastic material of the housing can penetrate at the circumference minimally in radial direction into the plastic filter element and generate a connection by material fusion in this way. Moreover, it is possible that the plastic material of the housing will at least minimally engage across the end face edges of the plastic filter elements at one or both end faces so that a form-fit connection is produced also.

While specific embodiments of the invention have been shown and described in detail to illustrate the inventive principles, it will be understood that the invention may be embodied otherwise without departing from such principles.

What is claimed is:

1. A method for producing an ion exchanger for a coolant, the method comprising the following steps:
   providing a first plastic material for injection molding;
   providing at least one porous filter element have numerous pores through which the coolant flows and whose diameter is sized to retain an ion exchange medium, the at least one porous filter element having rim side pores;
   inserting the least one porous filter element in an injection molding tool;
   injection molding the first plastic material into a mold tool together with a first porous filter element of the at least one porous filter element, forming an elongated circumferentially closed tubular housing having an inlet port formed on a first axial end of the tubular housing and an outlet port formed on an opposing axial end of the tubular housing;
   simultaneously with the injection molding step, embedding the first porous filter element into plastic material in the outlet of the housing at the same time, in the same step and simultaneously with the molding of the first plastic material into the elongated tubular housing in the injection molding step, such that the first plastic material penetrates into the rim side pores at a rim of the first porous filter element so that a form-fit connection with the first plastic material of the housing is produced;
   simultaneously with the injection molding step, embedding a second porous filter element of the at least one porous filter element into the first plastic material in the inlet of the housing at the same time, in the same step and simultaneously with the molding the elongated tubular housing in the injection molding step, such that the first plastic material penetrates into the rim side pores at a rim of the second porous filter element so that a form-fit connection with the first plastic material of the housing is produced;
   arranging an ion exchanger medium within the housing.

2. The method according to claim 1, wherein
   in the step of providing at least one porous filter element, the at least one porous filter element is at least one plastic filter element;

wherein in practicing the of injection molding, applying an increased pressure in the injection molding process to reduce a pore size of the at least one porous plastic filter element.

3. The method according to claim 2, wherein in the step of providing at least one porous filter element, the at least one porous filter element is comprised of a second plastic material; and wherein the first plastic material of the housing and the second plastic material have at least approximately the same melting point.

\* \* \* \* \*